UNITED STATES PATENT OFFICE.

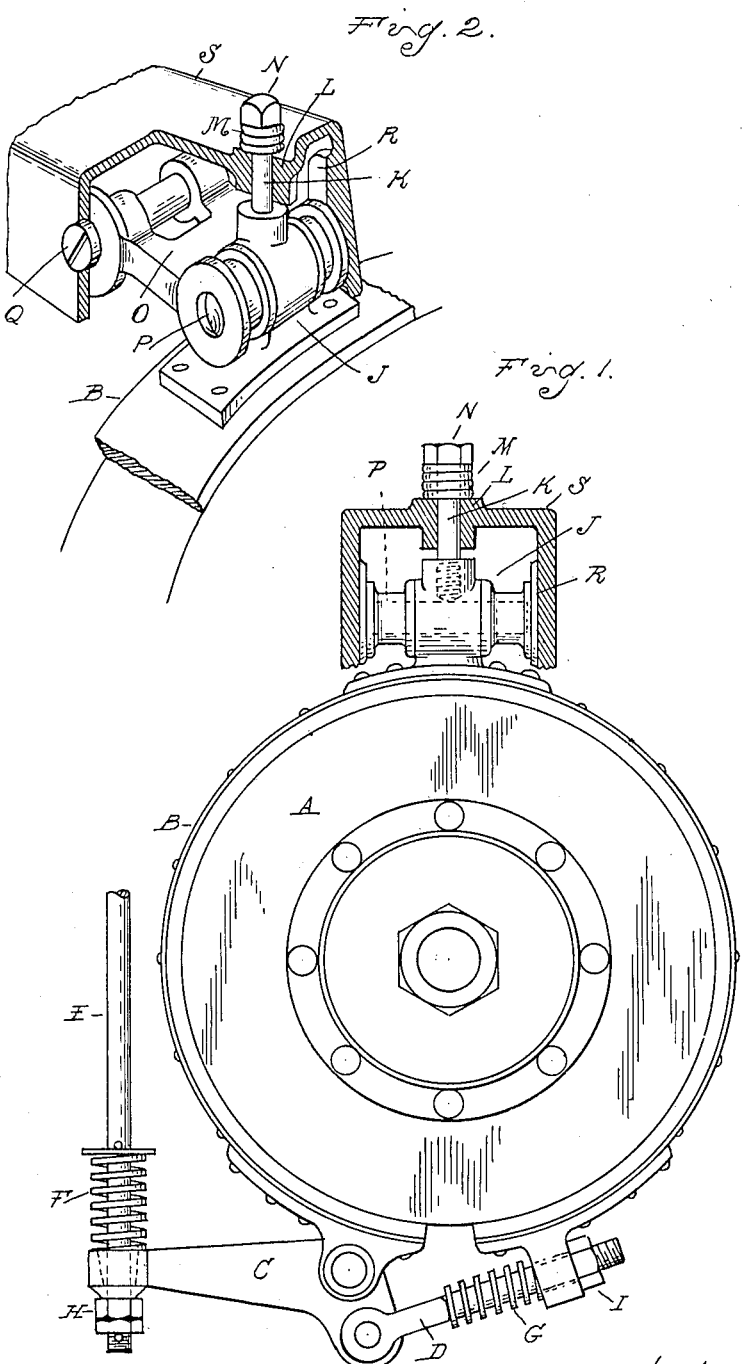

HOWARD E. COFFIN, OF LANSING, MICHIGAN, ASSIGNOR TO OLDS MOTOR WORKS, OF LANSING, MICHIGAN, A CORPORATION OF MICHIGAN.

BRAKE MECHANISM.

No. 878,506.　　Specification of Letters Patent.　　Patented Feb. 11, 1908.

Application filed April 14, 1906. Serial No. 311,701.

*To all whom it may concern:*

Be it known that I, HOWARD E. COFFIN, a citizen of the United States of America, residing at Lansing, in the county of Ingham and State of Michigan, have invented certain new and useful Improvements in Brake Mechanism, of which the following is a specification, reference being had therein to the accompanying drawings.

The invention relates to strap or band brakes, and has particular reference to the means employed for anchoring the brake strap, and for holding the same out of contact with the rotating head when the brake is released.

The invention consists in the peculiar construction, arrangement and combination of parts as hereinafter set forth.

In the drawings, Figure 1 is a sectional side elevation of a brake to which my improvements are applied; and Fig. 2 is a sectional perspective view of the anchoring means for the brake strap.

A is the revoluble brake head, and B the brake strap surrounding the same. The opposite ends of this brake strap are connected with suitable operating mechanism, which, as shown, comprises a bell-crank lever C, pivoted to one end of the strap, and connected by a link D to the opposite end.

E is a rod for actuating the bell-crank C, and F G are springs sleeved respectively upon the rod E and link D.

H I are nuts engaging threaded portions of the rod E and link G, and adjustable thereon against the tension of the springs F G for setting up the brake.

The brake strap is anchored to resist the torque of the head A by a connection intermediate its ends, preferably centrally between the same and diametrically opposed to the lever mechanism. This anchor connection is so constructed and arranged that when the brake strap is released it will be held out of contact with the revoluble head, and at the same time will permit the strap to be drawn into contact with said head at all points when the brake is applied. In detail, J is a flange member riveted or otherwise secured to the brake strap, and having an upwardly-extending shank K, which passes through a guide bearing L on a rigid portion of the frame. On this shank K is also sleeved a spring M, the tension of which, acting against a head N on the shank, normally draws the member J and strap attached thereto out of contact with the member A. The member J is held from lateral or angular movement by a bifurcated rock arm O, which embraces the same and is pivoted thereto by the pin P. This rock arm O extends laterally from the member J in a plane at right angles to the plane of rotation of the head A, and is itself pivoted to the stationary frame by the pin Q. Thus, the movement of the strap and member J towards or from the brake head is guided by the shank K, and the path of movement is further determined by the rock arm O, which prevents movement in the direction of rotation. Such a movement is further resisted by stationary bearings R at the opposite ends of the rock arm O, and these bearings, together with the bearing L, and bearing for the pin Q, are preferably formed in a bar or arm of the frame S, which is of channel cross section.

With the construction described, the member J, which supports the brake strap, is freely movable towards or from the axis of the rotating head, but its path of movement is absolutely determined by the engagement of the shank K with the bearing L, and the connection with the rock arm O. When the brake strap is tightened about the head A, the thrust is transmitted first to the member J, and then to the rock arm, O, while the opposed bearings or cheek-plates R will reinforce the rock arm O and prevent angular movement thereof.

During the application of the brake, the spring M will yield to permit the center portion of the brake strap coming in contact with the brake head, but as soon as the tension on the strap is released this spring will again retract the member J and strap attached thereto, so that the latter will be held out of contact with the head.

What I claim as my invention is:—

1. The combination with a revoluble brake head and a brake strap surrounding the same, of an anchor for said brake strap movable towards or from the axis of the head, and means for preventing angular movement of said anchor, and for receiving the thrust therefrom comprising parallel laterally extending bearings upon opposite sides of the anchor.

2. The combination with a revoluble brake head and a brake strap surrounding the same, of an anchor for said strap connected thereto centrally between its ends and movable towards or from the axis of the head, means for yieldably drawing said anchor away from said head, and means for guiding said anchor to prevent angular movement thereof, and for receiving the thrust therefrom comprising parallel laterally extending bearings upon opposite sides of the anchor.

3. The combination with a revoluble brake head and a brake strap surrounding the same of an anchor connected to said anchor and movable in a plane at right angles to the plane of rotation towards and from the axis of said head, and a stationary bearing for preventing lateral movement of said rock arm, and for receiving the thrust transmitted therethrough.

4. The combination with a rotary brake head and a brake strap surrounding the same, of an anchor connected to said brake strap, a rock arm connected to said anchor and movable in a plane transverse to the plane of rotation towards or from the axis of said head, and stationary cheek-plates embracing said rock arm for guiding the same, and receiving the thrust therefrom.

5. The combination with a revoluble brake head and a brake strap surrounding the same of an anchor connected to said brake strap, a bifurcated rock arm embracing said anchor and pivotally connected thereto, said rock arm being arranged in a plane transverse to the plane of rotation, a stationary bearing for preventing lateral movement of said rock arm, and a guide for said anchor restricting the movement thereof to the plane of rotation.

6. The combination with a revoluble brake head and a brake strap surrounding the same, of an anchor secured to said brake strap, a bifurcated rock arm embracing said anchor and movable in a plane at right angles to the plane of rotation, a stationary bearing for guiding said rock arm, a shank on said anchor extending radially from said head, a guide bearing for said shank, and a spring sleeved upon said shank for yieldably actuating the same away from said head.

In testimony whereof I affix my signature in presence of two witnesses.

HOWARD E. COFFIN.

Witnesses:
   CHAS. D. HASTINGS,
   CHAS. P. MILLER.